Dec. 16, 1958   R. L. SUTTON   2,864,486
TRASH MOVING CONVEYOR FOR CORN PICKERS
Filed May 27, 1954   2 Sheets-Sheet 1

INVENTOR
RALPH L. SUTTON
ATTORNEY

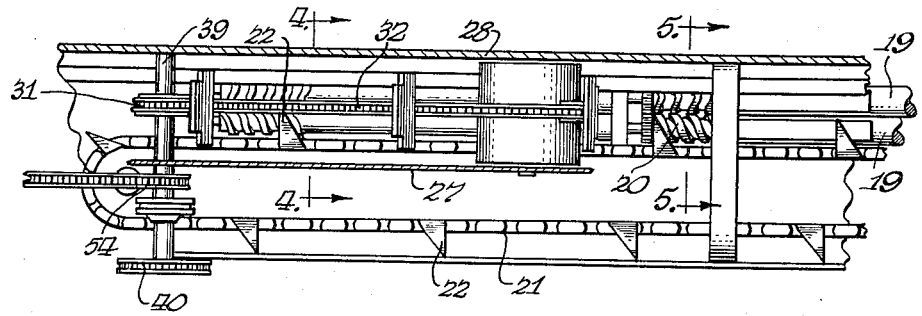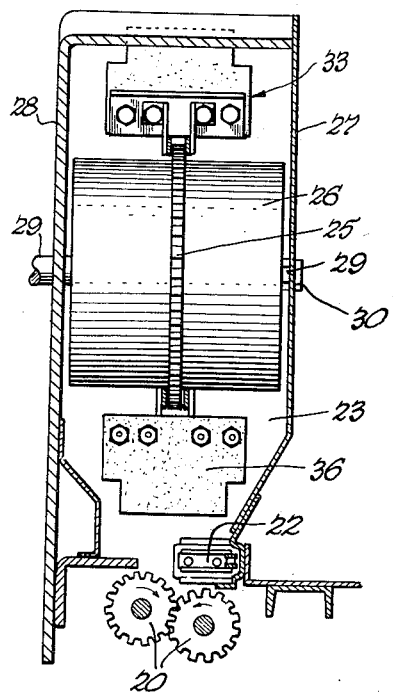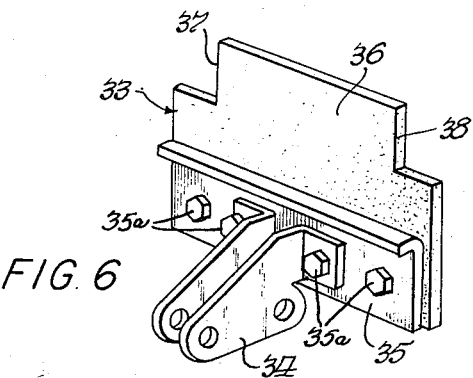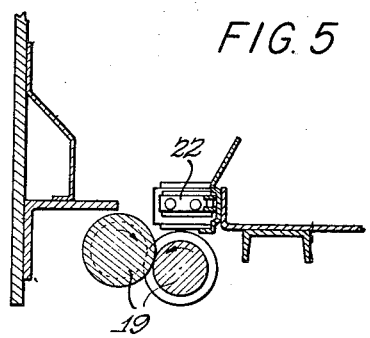

2,864,486

TRASH MOVING CONVEYOR FOR CORN PICKERS

Ralph L. Sutton, Davenport, Iowa, assignor to International Harvester Company, a corporation of New Jersey Application May 27, 1954, Serial No. 432,735

1 Claim. (Cl. 198—164)

This invention relates to a new and improved trash moving conveyor for corn pickers.

It is the function of corn harvesters or pickers to traverse a field of standing corn, to remove the ears of corn from the stalks and elevate the ears rearwardly through the corn picker and deliver these harvested ears to a discharge point which usually takes the form of a wagon elevator. Simultaneously with the picking of the ears of corn and the movement of the ears through the machine for cleaning and/or husking there is accumulated a considerable amount of trash such as broken stalks, husks, silks, and corn leaves which should be disposed of prior to delivery of the ears to the wagon elevator. Generally the forward portion of the corn picker includes the gathering unit having cooperative snapping rolls therein. The rearward portion of the machine is generally equipped with cleaning mechanism and on some occasions there is husking means employed in this portion of the corn picker. It is this area of corn cleaning and/or husking which must be continuously cleared of trash in order to permit the regular and uninterrupted depositing of clean ears of corn into the wagon elevator.

It is therefore a principal object of the present invention to provide a conveyor mechanism within the chamber of a corn picker in order to positively eject material from the machine.

An important object of this invention is the provision of a conveyor for removing trash from a corn picker of the type comprising an endless chain having cross slats thereon.

Another and further object of this invention is to supply an endless trash conveyor within a corn picker disposed over cleaning and/or husking means to facilitate the positive removal of trash from that area continuously through out the entire length thereof.

Another important object of this invention is to equip a corn picker with an endless trash conveyor of the endless chain type having regularly spaced-apart cross slats thereon and disposed above the husking means and within the husking chamber.

Still another important object of this invention is to provide a sprocket at the forward end of the trash conveyor having a relatively wide laterally extending drum portion substantially equal in diameter to the diameter of the sprocket and substantially as wide as the width of the cross slats of the trash conveyor whereby trash entering that area will not be permitted access to a position between the upper and lower runs of the trash conveyor.

Other and further important objects and advantages will become apparent from the disclosures in the following specification and accompanying drawings.

In the drawings:

Figure 3 is a sectional view taken on the line 3—3 of Figure 2;

Figure 4 is an enlarged sectional view taken on the line 4—4 of Figure 3;

Figure 5 is an enlarged sectional view taken on the line 5—5 of Figure 3; and

Figure 6 is an enlarged perspective view of one of the flight members employed on the trash moving conveyor of this invention.

Figure 1:
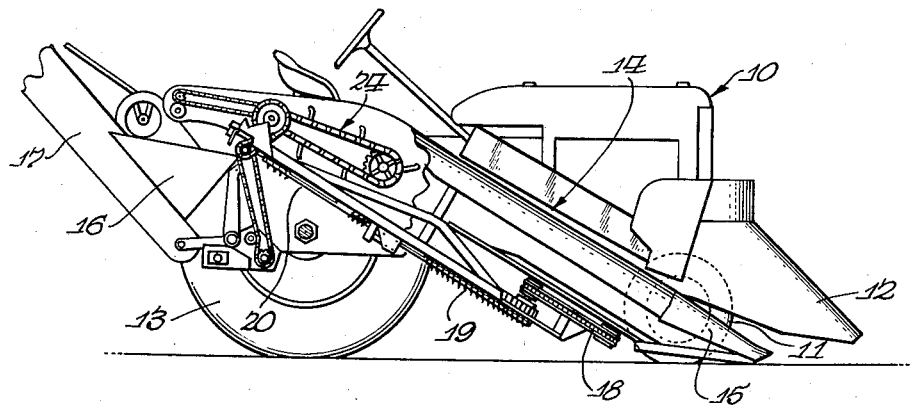
Fig. 1 is a side elevational view of a tractor mounted corn picker with portions broken away to show the trash moving conveyor of this invention incorporated therein.

As shown in the drawings, the reference numeral 10 indicates generally a tractor on which the corn picker of this invention is mounted. The tractor 10 is provided with front steerable or dirigible wheels 11 which have a center divider or shield 12 thereover. The shield or center divider 12 is adapted to guide the vehicle through the rows of corn and lift the down stalks and move them to either one side or the other of the front wheels 11 of the tractor. The tractor is also equipped with large rear traction wheels 13 disposed on either side of the tractor. A corn picker and including the frame structure designated by the numeral 14 is mounted on and thus forms a part of the tractor 10.

The corn picker generally includes a forwardly extending picker portion 15 which is adapted to pick ears of corn and carry them rearwardly through the machine for ultimate depositing in a hopper 16 at the rear thereof whereafter they are elevated upwardly and rearwardly by an elevator mechanism 17 for delivery into a trailing wagon or the like, not shown. The picker portion 15 of the corn picker is provided with gathering chains 18 which are adapted to cause the stalks to be carried into the machine for subsequent treatment. The picking unit is also provided with cooperative snapping rolls 19 which are mounted therein in a forwardly and downwardly inclined manner. The cooperative snapping rolls 19 are adapted to have standing stalks of corn delivered centrally thereof by means of the gathering unit 15 and the gatherer chain 18 and the downward movement of the snapping rolls 19 by reason of their rotating inwardly toward each other, as viewed from the top, causes the stalks to be pulled downwardly until the ear of corn on the stalk arrives at the juncture between the rolls. At this point the ear being much too large to pass through the snapping rolls is snapped or stripped from the stalk. At this point the corn is freed from the stalk for ultimate delivery to the receiving hopper 16. In the corn picker shown in the drawings of this invention there is also included husking rolls 20 which are continuations of the snapping rolls and extend upwardly and rearwardly in alignment with the snapping rolls 19. An ear forwarder conveyor 21 having flights 22 thereon are adapted to carry the stripped or snapped ears of corn upwardly over the snapping rolls after they have been removed from the stalks and thereafter over the husking rolls, at which time the husks are removed from the ears by the inwardly and downwardly cooperating action of the husking rolls 20.

A chamber designated by the numeral 23 is disposed above the husking rolls 23. This chamber which is defined or located as above the husking rolls is present even in corn pickers where there are no husking rolls employed. The chamber 23 has a tendency to accumulate trash incident to the harvesting of corn and it is the prime object of the present invention to provide means for removing the accumulated trash from this chamber 23. The trash being discussed might take the form of broken pieces of stalks, husks and/or corn leaves.

In the present invention the means for effectively removing trash from this critical area in the corn picker is a conveyor means 24. A forwardly disposed sprocket 25 is adapted to carry the forward end of the conveyor means 24. The sprocket 25 includes a large diameter drum formed therewith. The drum 26 is substantially as large in diameter as the sprocket and has a width substantially equal to the distance between spaced walls 27 and 28 which define the side portions of the chamber 23. A shaft 29 carries the drum and spocket 25—26 and is journaled at 30 within the spaced walls 27 and 28 of the chamber 23. The conveyor means 24 is also provided with a rear sprocket 31 disposed at a distance spaced rearwardly on the corn picker from the forwardly disposed sprocket 25. The conveyor means 24 is basically in the form of a chain 32 which engages the spaced sprockets 25 and 31. The chain is equipped with cross slats 33 and as shown in Figure 6, the cross slats 33 are provided with lugs 34 which engage the chain 32 for mounting directly in the chain and constituting links thereof. Each cross slat is provided with a transversely disposed metal base portion 35 which is fastened by means of bolts 35a to the lug 34. A tire carcass or other resilient paddle member 36 is mounted on the metal base 35. The paddles 36 are adapted to engage the trash and actively move it rearwardly over the husking bed or deck in cooperation with an ear conveyor chain operating at the same speed throughout the entire length of that portion of the corn picker so that there is no dead area in this chamber 23. The paddles 36 are spaced at regular intervals about the chain and their radial extension is substantially equal to a point just short of engagement with the ear conveyor chain 21.

As shown more specifically in Figure 6, the paddles of tire carcass 36 have their corners notched out as at 37 and 38. As shown in Figure 4, the purpose of the corner notching at 37 and 38 is to permit the full extension of the paddles down to their close proximity to the ear forwarder chain positioned directly over the husking rolls 20.

Figure 2:
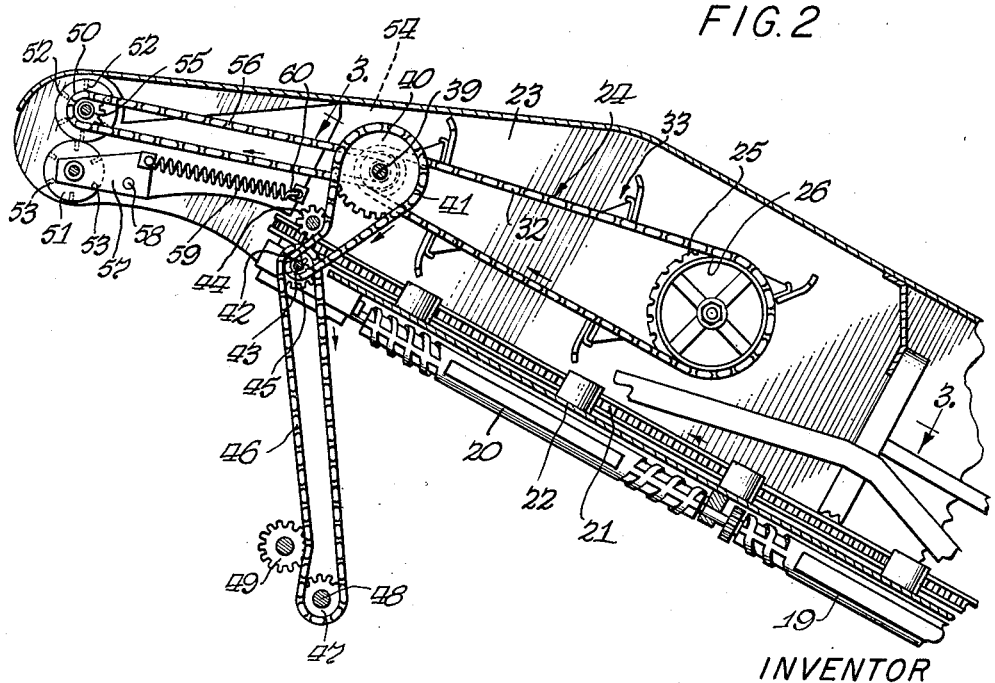
Figure 2 is an enlarged view of a portion of the device of Figure 1 with a portion thereof broken away and further portions shown in section in order to clearly illustrate the trash moving conveyor and its geographical arrangement within the corn picker.

As best shown in Figures 1, 2, and 3, the sprocket 31 is mounted on a shaft 39. This shaft 39 is journaled in the spaced walls 27 and 28 in a manner comparable to the journaling of the shaft 29 which carries the forwardly disposed drum sprocket. Another sprocket 40 is affixed to the shaft 39 on the outer end thereof in order to admit drive to the shaft for propelling the conveyor means 24 within the chamber 23. A chain 41 is draped over the sprocket 40 and extends downwardly and somewhat rearwardly for engagement with a sprocket 42 affixed to a jack shaft 43 which is journally carried on the corn picker at a position to the rear of the husking unit of the corn picker. An idler sprocket 44 is mounted on the frame structure of the corn picker and is adapted to engage the chain 41 and keep it properly tensioned to effect driving relationship between the sprockets 40 and 42. A second sprocket 45 is mounted on the jack shaft 43 spaced from the sprocket 42 and by means of a drive chain 46 engaging the sprocket 45 and a spaced apart sprocket 47 on a drive shaft 48, rotational drive is delivered to the jack shaft 43. An idler sprocket 49 is adapted to engage the chain 44 and keep it properly tensioned. The drive shaft 48 receives its rotational power from the tractor power take-off means, not shown. It is thus evident that the trash removing conveyor is actuated to move trash from the full length of the chamber 23 and carry this trash rearwardly by reason of movement of the lower flight of the conveyor means 24 rearwardly through the chamber and deposit the trash at the outer end of the corn picker.

In order to properly treat the trash for discharge back onto the field, it is preferable that the trash be crushed so that it will act as a mulch for the soil. In order to accomplish this end, a pair of trash crushing rolls 50 and 51 are provided in the upper rear portion of the corn picker so that the trash moved rearwardly by the conveyor means 24 will pass through the juncture between the trash crushing rolls and thereupon be discharged to the ground. Radially extending transverse ribs are positioned on the upper trash roll 50 and similarly radially disposed transversely extending ribs 53 on the lower trash roll 51 intermesh with the ribs of the upper roller whereupon the rolls cooperate with each other to effectively crush the trash as it passes therebetween. The driving means for the trash rolls is secured from the shaft 39. A sprocket 54 is fixedly mounted on the shaft 39 and a sprocket 55 is mounted on the outer end of the upper roll 50 of the trash rolls. A chain 56 joins the sprockets 54 and 55 and thus delivers drive from the sprocket 54 and its shaft 39 to the upper trash roll 50.

The lower trash roll 51 is mounted on a bell crank type arm 57 which is journally mounted thereon. The bell crank arm 57 is hinged at 58 on the frame supporting structure of the corn picker. A spring 59 is attached to the bell crank lever or arm 57 at a position spaced from the hinge 58. The arrangement of the spring is such that the lower trash roll is urged upwardly against the upper roll 50. The other end of the spring 59 is anchored as shown at 60 to a fixed portion of the frame supporting structure of this corn picker.

In the operation of the device of this invention the tractor mounted corn picker is adapted to traverse a field of standing corn which is ready to be harvested. The standing corn is guided into the corn picker and into the snapping rolls whereupon the ears are stripped or snapped from the stalks and thereupon the ears are elevated upwardly and rearwardly over the snapping rolls and subsequently over the husking rolls or deck and through the chamber 23. This chamber 23 above the husking bed of the corn picker occasionally receives and collects quantities of trash which accumulate in the normal process of picking and husking corn. The cross slats 33 which are regularly spaced about the chain conveyor 32 have their resilient paddle members 36 actively moving trash within the chamber 23 upwardly and rearwardly along with movement of the ears of corn which are carried by an ear conveyor chain within the lower portion of this chamber.

It is obvious, therefore, that there are no dead spaces within the chamber 23 for trash to accumulate. Particular attention is directed to the enlarged drum member which forms a part of the forwardly disposed sprocket carrying the forward portion of the conveyor means 24. This enlarged drum prevents trash and other foreign material from entering to a position between the upper and lower runs of the trash removing conveyor 24 and guides material downwardly and under beneath the conveyor whereupon it may be engaged by the resilient paddles 36 forming part of the cross slats 33 of this chain type conveyor. The ears of corn which have been harvested by this machine are carried over the ends of the husking rolls 20 or deck and deposited into the hopper 16 at the rearward portion of the picker and at the same time the trash which is removed from the chamber 23 above the husking rolls is delivered rearwardly for passage through the cooperative trash crushing rolls. These trash crushing and removing rolls at the far outer end of the picker provide for proper treatment of the trash prior to its deposit on the ground. The crushed trash forms an adequate mulch for the soil and tends to aerate the soil. Further the rolls 50 and 51 tend to snap any ears from stalks which were not snapped by the regular snapping rolls. These ears would then fall directly into the corn receiving hopper and the stalks are moved or thrown out the end of the machine.

It is apparent that herein is provided a corn picker having means for effectively removing the trash from the picker by means of an endless conveyor disposed over the husking bed and/or over the ear conveyor portion of a picker which does not have the husking rolls and subsequently crushing this trash by suitable cooperative ribbed rolls and depositing that trash onto the ground.

Numerous details of construction may be varied throughout a wide range without departing from the principles disclosed herein and I, therefore, do not pro-

What is claimed is:

A corn picker comprising a frame supporting structure, cooperative husking rolls journally mounted on said frame supporting structure in a generally horizontal plane, means rotating said husking rolls for inward and downward movement on the top and adjoining sides thereof, first conveyor means mounted on said frame supporting structure and arranged and constructed to feed ears of corn along and over said cooperative husking rolls, said first conveyor means including an endless chain and ear forwarder flights at intervals thereon, and said ear forwarder flights extending laterally inwardly from the side of one of said cooperative rolls, an enclosure on said frame supporting structure above said cooperative husking rolls and defining an enlarged chamber thereover, a second conveyor means mounted in said enclosure and running substantially the length of said cooperative husking rolls, and said second conveyor means having longitudinally spaced apart forward and rearward sprockets in said enlarged chamber and an endless chain mounted on said spaced apart sprockets and defining an upper and a lower flight and said chain having paddles at intervals therearound, and said paddles on the lower flight depending downwardly over said cooperative husking rolls and spaced above said first conveyor means whereby trash incidental to picking and husking corn entering said enlarged chamber is removed by said second conveyor, and said forward sprocket having a large diameter drum formed therewith to substantially fill the vertical and horizontal extent of said enlarged chamber.

References Cited in the file of this patent

UNITED STATES PATENTS

| | | |
|---|---|---|
| 1,043,313 | Glick | Nov. 5, 1912 |
| 1,315,465 | Carbo | Sept. 9, 1919 |
| 1,952,507 | Lindgren et al. | Mar. 27, 1934 |
| 2,080,717 | Hitchcock | May 18, 1937 |
| 2,196,609 | Redler | Apr. 9, 1940 |
| 2,525,058 | Andrews | Oct. 10, 1950 |
| 2,631,459 | Transeau | Mar. 17, 1953 |
| 2,665,695 | Slavens | Jan. 12, 1954 |
| 2,676,450 | Schaaf et al. | Apr. 27, 1954 |